United States Patent [19]

Mynhier

[11] Patent Number: 4,753,143

[45] Date of Patent: Jun. 28, 1988

[54] PORTABLE FACING AND THREADING MACHINE

[76] Inventor: Charles R. Mynhier, 10251 Rockcrest, Houston, Tex. 77041

[21] Appl. No.: 881,456

[22] Filed: Jul. 2, 1986

[51] Int. Cl.$^4$ ............................................. B23B 3/22
[52] U.S. Cl. ........................................ 82/4 R; 82/4 C
[58] Field of Search ...................... 82/4 R, 4 C, 5, 15, 82/17; 10/87, 96 T, 102; 408/79, 80, 82, 104, 105, 106; 33/199 R, 199 B

[56] References Cited

U.S. PATENT DOCUMENTS

| | | | |
|---|---|---|---|
| 3,181,398 | 5/1965 | Rogers | 82/4 C |
| 3,772,944 | 11/1973 | Becker et al. | 82/4 C |
| 3,908,491 | 9/1975 | Gilmore | 82/4 C |
| 4,130,034 | 12/1978 | Benoit | 82/4 C |
| 4,259,885 | 4/1981 | Lindhag | 82/4 R |
| 4,314,491 | 2/1982 | Hartmann et al. | 82/4 C |
| 4,343,207 | 8/1982 | Paysinger | 82/4 C |
| 4,411,178 | 10/1983 | Wachs et al. | 82/4 C |
| 4,543,861 | 10/1985 | Kwech et al. | 82/4 R |
| 4,648,294 | 3/1987 | Jacquot et al. | 82/4 C |

Primary Examiner—Nicholas P. Godici
Assistant Examiner—Gerard M. Reid
Attorney, Agent, or Firm—Bill B. Berryhill

[57] ABSTRACT

A portable machine for field facing and threading of pipe including a housing in which is carried a shaft for rotation about a central axis. Attachment apparatus attaches the housing to the end of a pipe so that the central axis of the machine and pipe are substantially coaxial. Attached to the shaft is a cutting tool assembly which rotates with the shaft to cut the end of the pipe. Linear and radial feed components provide, respectively, generally longitudinal and transverse motion to the cutting tool assembly relative to the central axis of the machine.

25 Claims, 4 Drawing Sheets

PORTABLE FACING AND THREADING MACHINE

BACKGROUND OF THE INVENTION

1. Field of the Invention

The present invenion pertains to apparatus for machining pipe or the like. More specifically, the present invention pertains to portable apparatus suitable for field machining of pipe, e.g., threading, rethreading, facing, refacing, etc.

2. Description of the Prior Art

Sections of pipe are frequently connected for various purposes. These pipe sections may be connected in several ways. Many are connected by a threaded joint in which external threads at the end of one section of pipe threadedly engage internal threads of another section of pipe. In drilling for oil and gas, such threaded pipe joints are used to join sections of drill pipe which extend from drilling rig down to the drilling bit.

The seal between the adjacent drill string pipe sections is usually provided by metal to metal engagement of a shoulder on the male or pin end of a pipe and the annular end face of the female or box end of the adjacent pipe. It is important that this seal be maintained. Due to the hostile environment and rough handling of drill pipe, the seal faces and the pipe threads are frequently damaged in the field. In the past, the damaged pipe sections were sent to a machine shop for refacing and/or rethreading. Since the pipe must necessarily be transported from the field to the machine shop and back to the field, this process is quite costly.

In recent years, portable machines have been developed for refacing of damaged pipe joints. Examples of such portable refacing machines may be seen in U.S. Pat. Nos. 3,124,024; 3,181,398; 3,691,882; 3,717,055; 4,130,034 and 4,149,436. Most of these machines utilize some type of support or mandrel which is attached to the pipe to be machined by engagement with the threads thereof. Some type of cutting tool is then provided which, upon proper rotation and feeding, cuts a new surface or face on the pipe joint.

Thus, a pipe joint can be refaced in the field at a much less cost than transporting the pipe to a machine shop for repair thereof. Such refacing machines are therefore useful if the pipe joint requires refacing only. However, if the threads are damaged or if it is necessary to cut off a portion of the pipe and cut new threads and faces thereon, such portable facing machines are not adequate. In particular, there does not appear to be a portable machine capable of field rethreading a damaged joint or capable of cutting new threads on a joint which has been cut off.

SUMMARY OF THE INVENTION

The present invention is directed to a portable machine which is not only capable of facing or refacing of pipe joint shoulders but is also capable of threading or rethreading the threads of such a pipe joint. Thus, the capability of refacing provided by some of the prior art is joined with the capability of threading or rethreading in a single portable machine.

The portable machine of the present invention includes a housing which carries a main shaft for rotation therein about a central axis. Attachment means is provided for attaching the housing to the end of a pipe so that the central axis of the main shaft and the axis of the pipe are substantially coincidental. A power device may be attached to the main shaft for rotation thereof. Tool mounting means is attached to the main shaft for rotation therewith and a cutting tool assembly is attached to the tool mounting means for cutting the pipe end upon rotation of the main shaft. Translating means is attached to the cutting tool assembly and is operable in response to the rotation of the main shaft to translate the rotatable movement thereof to simultaneous linear movement of the cutting tool assembly so as to produce spirally cut surfaces such as threads on the pipe end. Linear and radial feed means are carried by the housing and operable to provide generally longitudinal and transverse motion, respectively, to the cutting tool assembly relative to the central axis. The radial feed means may be operable independently of the translating means.

The means for attaching the housing of the portable machine to the end of a pipe comprises a jaw assembly attachable to the pipe end independently of the housing and including a circular base plate for concentric alignment with the pipe end. The attachment means also comprises a circular housing base affixed to the housing and the center of which coincides with the main shaft central axis. The housing base is attachable to the jaw assembly, after attachment of the jaw assembly to the pipe end, so that the central axis and the pipe axis are substantially coincidental. A thread gage assembly is attachable to the circular base plate before attachment of the housing base to the jaw assembly and the thread gage assembly is engageable with thread on the pipe to concentrically align the circular base plate with the pipe end. The thread gage assembly is then removeable to allow attachment of the housing base to the jaw assembly so that the central axis and the pipe axis are coaxially aligned.

DESCRIPTION OF A PREFERRED EMBODIMENT

Figure 1:
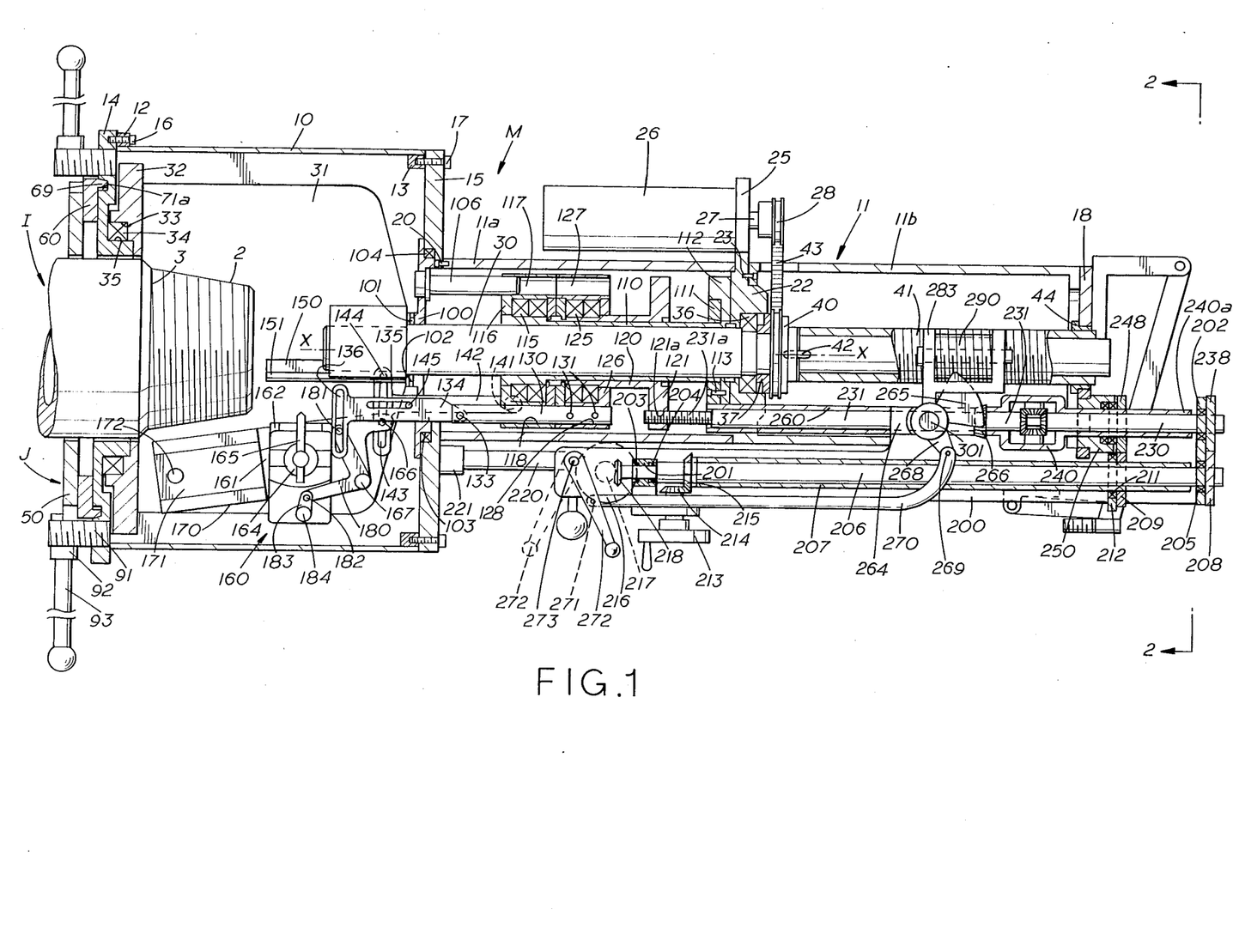
FIG. 1 is a longitudinal view, partially in section, showing the portable field facing and threading apparatus of the present invention attached to the end of a pipe for performing certain machining operations thereon, according to a preferred embodiment of the invention.

Referring first to FIG. 1, there is shown attached to the end of a pipe joint 1 a portable machine M for performing certain field machine cutting operations on the end of the pipe 1. The pipe end 1 shown on the drawing is typical of a drill string joint for which the apparatus was primarily developed. The pipe end shown is the male or pin end which has a threaded or tapered pin 2 at the base of which is an annular sealing surface 3. In use in drilling an oil or gas well, the pin 2 would be threadedly engaged with a female or box end of an adjacent section of drill pipe and the annular surface 3 would be in metal-to-metal sealing engagement with a cooperating annular surface of the box end of the pipe joint of which it would be mated.

As previously mentioned, it is important, particularly in drilling operations, that a sound connection be made between pipe joints and that a high pressure seal be maintained therein. For this reason, it is important that the threads 2 and the annular surface or face 3 be maintained in good condition. If these areas are damaged or worn they should be repaired. The machine M of the present invention is specifically designed to repair or recondition these surfaces in the field.

The machine M includes a generally cylindrical housing which, in the present case, includes a large diameter section 10 and a small diameter section 11. The cylindrical section 10 may be welded to rings 12 and 13 by which the section 10 may be attached to a circular housing base 14 and a ring plate 15 by machine bolts 16, 17 or the like.

The smaller diameter section 11 of the housing is actually made of an intermediate section 11a and an end section 11b. The intermediate section 11a is attached to ring plate 15 by machine screws or any other suitable means at the opposite end by similar machine screws to a motor mount or bulkhead 22. The section 11b may be attached to the bulkhead 22 by machine bolts or screws. Attached to the bulkhead 22 by a clamping bracket 25 is a power device such as an electric, hydraulic or pneumatic motor 26 to the shaft 27 of which is attached a chain sprocket 28.

Centrally disposed in the housing for rotation therein about a central axis X—X is a main shaft 30 to one end of which is attached a tool mounting plate 31 which is offset from the central axis X—X so as not to contact pipe end 1 when axis X—X and the axis of the pipe end 1 are coaxially aligned. A support ring 32 is affixed to the mounting plate 31. An inner shoulder 33 thereon rests against a bearing 34 which in turn rests against an outer shoulder 35 of the circular housing base 14. Thus, one end of the shaft 30 is supported for rotation within the housing 10, 11 by the circular housing base 14, the circular ring 32, and the cooperating bearing 34. The main shaft 30 is also supported for rotation within a bearing 36 carried by bulkhead 22. A bearing retainer ring 37 threadedly engages the recess in which the bearing 36 is carried to hold the bearing 36 in place. Removal of the retainer ring 37 allows replacement of the bearing 36.

The right end of the main shaft 30 (as viewed in FIG. 1 is of a reduced diameter for receiving a chain sprocket 40 and thread guide 41. The sprocket 40 and thread guide 41 are keyed to the main shaft 30, such as shown by the key 42, so that they rotate therewith. A chain 43 may connect the chain sprockets 28 and 40 so that rotation of the power means 26 results in rotation of main shaft 30. The thread guide 41 rotates with the main shaft 30 and both are supported at one end by a sleeve bushing 44 carried in the end plate 18 of the housing section 11b. The exterior of the thread guide 41 is provided with a spiral thread of a preselected pitch, the purpose of which will be more fully explained hereafter.

It is important at this point to understand the manner in which the portable machine M of the present invention is attached to the pipe end 1. Such attachment is provided by attachment means which includes the circular housing base 14 and a jaw assembly J which is attachable to the pipe end 1 independently of the machine M. As best seen in FIGS. 4–7, the jaw assembly J comprises a circular jaw plate 50 attached to which is a plurality of jaw carriers 51 in each of which is carried a jaw screw 52 at the end of which is a jaw 53. Rotation of the jaw screws 52 by engagement of a wrench with wrench flats 54 causes the jaws 53 to move radially inwardly or outwardly, depending upon the direction of rotation of the jaw screws 52.

Also attached to the jaw plate 50 is a circular base plate 60. A plurality of axial orientated holes 61, (see FIG. 6) around the circular base plate 60 receive the threaded end of a stud 62 the opposite threaded end of which carries a locking handle 63 and lock nut 64. The stud 62 extends through a cone member 65 in which is housed a spring 66 which surrounds the stud 62, one end bearing against the cone 65 and the other being received with in a counterbored portion 67 of a hole 68 in the jaw plate 50. The hole 68 is of larger diameter than the external diameter of stud 62 so that when the handle 63 is loosened, a slight amount of eccentricity is permitted between the jaw plate 50 and the circular base plate 60. However, upon tightening of the handles 63 against the cone 65, the jaw plate 50 and circular base plate 60 are rigidly held in a fixed relationship. Tightening down of the lock nut 64 maintains this fixed relationship.

Figure 4:
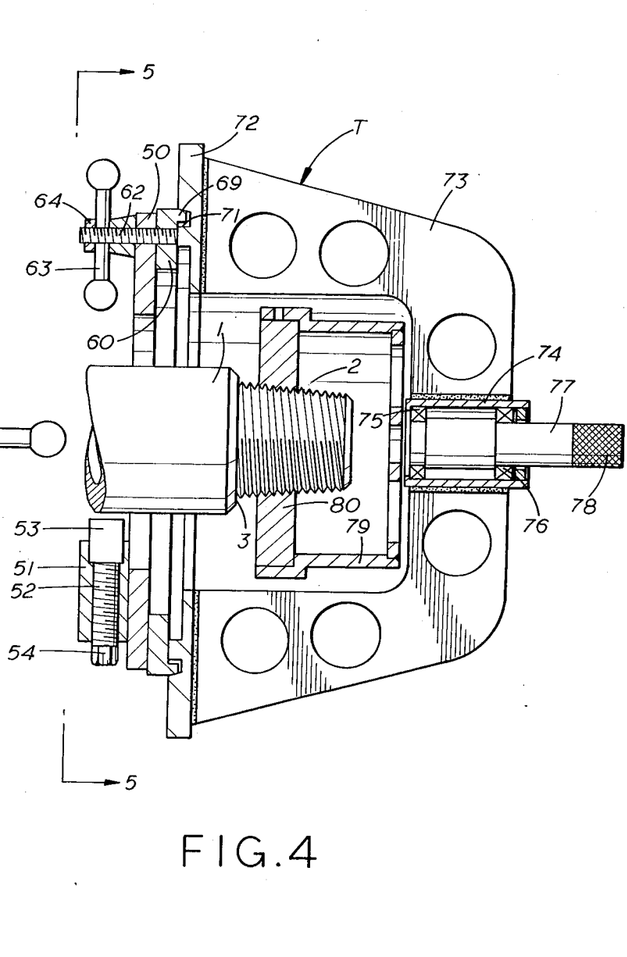
FIG. 4 is a longitudinal view, partially in section, of a portion of the means for attaching the portable apparatus of the present invention to one end of a pipe and also showing a thread gage assembly attached thereto for concentrically aligning the attachment means with the pipe end.

It will be noted that the circular base plate 60 is provided with an annular lip 69. As shown in FIG. 4, the annular lip 69 is engaging an annular groove 71 of a circular plate or ring 72 which makes up a portion of a thread gage assembly T. The thread gage assembly T includes a yoke or gage carrier 73 which has a central hub 74 in which is carried a pair of bearings 75, 76 rotatingly supporting a shaft 77. One end of the shaft 77 is knurled as at 78 to provide friction engaging means for rotation of the shaft 77. To the opposite end of shaft 77 is attached a cylindrical cap 79 which holds a thread gage 80. The gage 80 is threaded to correspond with the threaded portion 2 of the pipe end 1 so that upon engagement of the thread gage 80 with the threads 2 the thread gage 80 may be rotated by rotating shaft 77, e.g., by grasping the knurled portion 78 thereof with the hand. It should be understood then that when the thread gage 80 is properly threaded on the threaded portion 2 of the pipe end 1, the pipe end 1 and the shaft 77 will be coaxially aligned. The groove 71 on the plate 72 is machined so that it is perfectly concentric with the axis of shaft 77. Thus, the groove 71 will be perfectly concentric with the axis of the pipe end 1.

Figure 5:
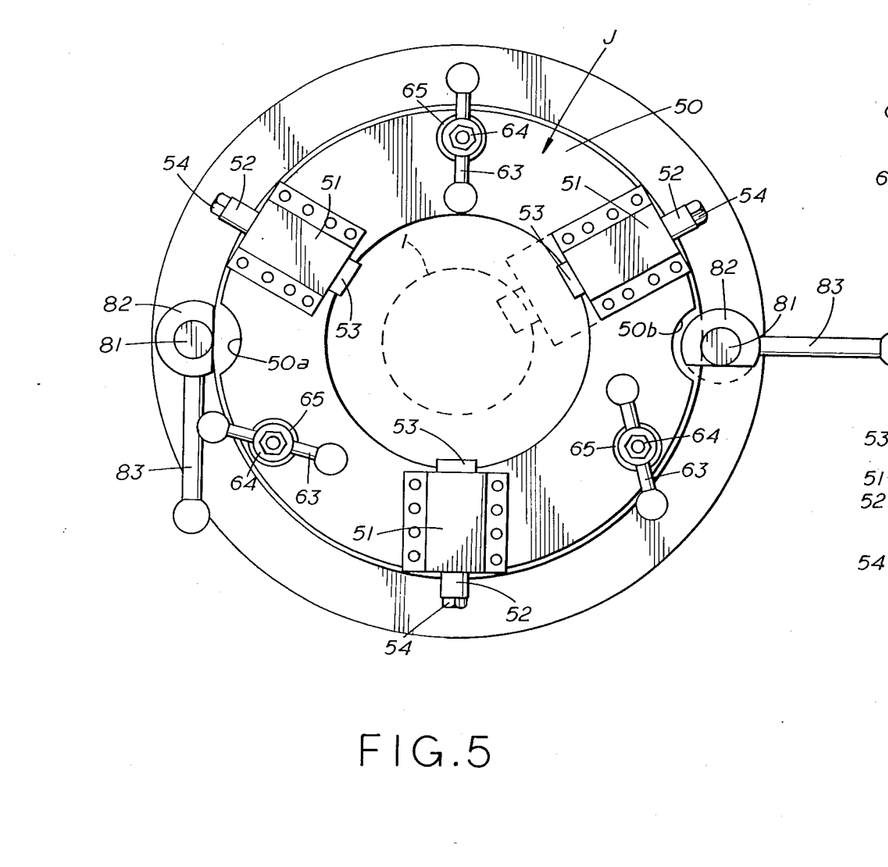
FIG. 5 is an end view, taken along lines 5—5 of FIG. 4, of the attachment means of FIG. 4 for use with the apparatus of the present invention.
Figure 6:
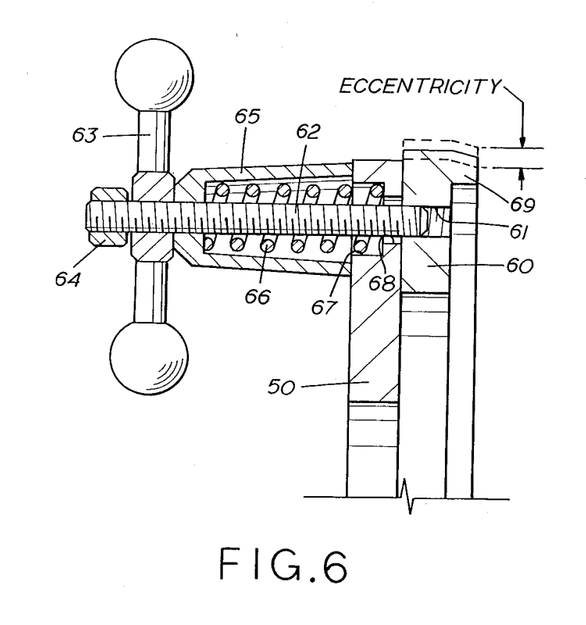
FIG. 6 and FIG. 7 are detailed views of portions of the attachment means shown in FIG. 5.

The entire thread gage assembly T may be attached to the circular base plate 60 and the jaw assembly J, by a plurality of locking devices which include a stud 81 threaded into a hole in the ring 72, a partial nut 82 threaded thereon and a handle 83 extending from the partial nut. The thread gage assembly T is attached to the jaw assembly J by first mating the annular groove 71 and the annular lip 69 with the locking devices in the position illustrated by the lefthand locking device in FIG. 5. Then the handles 83 are grasped and the partial nuts 82 rotated ninety degrees to a postion such as illustrated by the right-hand locking device in FIG. 5. Thus, these locking devices are rotatable from a first or unlocked position (as shown at the left of FIG. 5) to a second or locked position (as shown at the right of FIG. 5). It will be noted that a portion of the circular base plate 50 is cut away at 50a and at 50b to allow rotation of the partial nut 82. The partial nut 82 is initially threaded on the stud 81 to a proper postiion so that upon ninety degrees rotation, to the position illustrated at the right of FIG. 5 and in FIG. 7, it engages the side of the circular base plate 60 opposite lip 69. As the circular base plate 60 is engaged and the partial nut 82 further threaded on the stud 81, the lip 69 will completely engage the groove 71 pulling the circular base plate 60 to concentric alignment with the shaft 77 of the thread gage assembly T and consequently with the pipe end 1. This, of course, assumes that the circular base plate 60 is allowed some degree of radial movement relative to the jaw assemblage J. This, will be the case if the handles 63 are slightly loosened. However, once the circular base plate 60 is properly aligned, the handles 63 may be tightened and a fixed relationship may be established between jaw plate 50 and circular base plate 60. After this is accomplished, the handles 83 and partial nuts 82 may be rotated to an unlocked position so that thread gage assembly T may be totally removed from the pipe end 1, leaving the circular base plate 60 in a rigid fixed concentric relationship with the pipe end 1.

Figure 7:
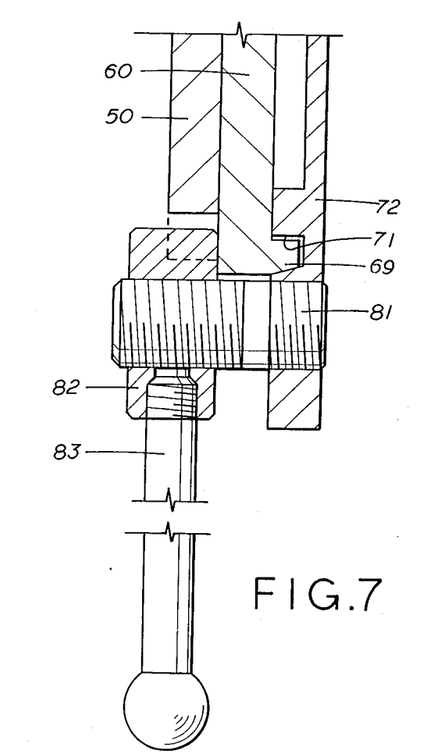

When the thread gage assembly T is removed, it is then possible to attach the machine M to the jaw assembly J as shown in FIG. 1. It will be noted that the housing base plate 14 is provided with an annular groove 71a which corresponds with the annular groove 71 of the thread gage assembly T. The groove 71a is machined concentrically with the axis X—X of the main shaft 30. It will also be noted that locking devices similar to those provided with the thread gage assembly T of FIGS. 4, 5 and 7 are affixed to housing base plate 14. These locking devices include threaded studs 91, partial nuts 92, and handles 93 which correspond with the same elements 81, 82 and 83 respectively of the thread gage assembly T. Thus, with annular lip 91 engaging the annular groove 71a the machine M may be firmly attached to the jaw assembly J by movement of the handles 93 and engagement of the partial nuts 92 with the back or opposite side of the circular base plate 60. Once the machine M is attached to the jaw assembly J in this fashion, the central axis of the main shaft 30 and the axis of the pipe end 1 are substantially coaxial.

Returning now to FIG. 1, it is remembered that the main shaft 30 is rotatable within the housing 10, 11. It is also seen that the mounting plate 31 also rotates therewith. Attached to the main shaft 30 adjacent to the tool mounting plate 31 is a flange like member 100 which is affixed to the main shaft 30 by set screws (not shown). The flange member 100 has a shoulder 103 thereon which rides within a bearing 104 supported in the ring plate 15 so that the flange member 100 freely rotates with the main shaft 30. Threadedly engaging a threaded hole 105 in the flange member 100 is a driving pin 106 which projects perpendicularly from the flange 100 so that it's axis is parallel to the central axis X—X of the main shaft 30.

Surrounding the main shaft 30 is a tubular carrier or sleeve 110 which threadedly engages a ring 111 which is, in turn, fixed to a surrounding flange 112 by cap screws (not shown). Thus, the tubular carrier or sleeve 110 does not rotate. However, since there is a slight clearance between the main shaft 30 and the internal diameter of the sleeve 110, the main shaft 30 is allowed to rotate therein. Surrounding the sleeve 110 is an outer sleeve 120 at one end of which is a radial flange 121. The inner sleeve or carrier 110 supports a set of bearings 115 and the outer sleeve or carrier 120 supports a set of bearings 125 which in turn rotatingly support surrounding carrier spools 116 and 126 respectively. One side of each of the spools 116 and 126 is penetrated by cylindrical openings 117 and 127 which may slidingly receive a portion of the pin 106. The opposite side of the spools 116 and 126 are penetrated by cylindrical openings to receive a cylindrical push rod 130. The push rod 130 is attached to spool 126 by pins 131. There is a sliding relationship between the push rod 130 and the cylindrical hole 118, allowing a separation of spools 116 and 126 in certain operations of the machine M.

Attached by pin 133 and extending therefrom is an elongated arm 134 which has a longitudinal slot 135 therein and at the distal end of which is a transverse slot 136. Attached to carrier spool 116 by a pin or pivot connection 141 is another elongated arm 142 at the distal end of which is a transverse slot 143. Extending from the end of the main shaft 30 is a guide member 150 which has a guide slot 151 which is parallel to the central axis X—X. A pin 144 is affixed to the arm 142 and engages the guide slot 151. It can thus be understood that longitudinal displacement of the spool 116 on the main shaft 30 will cause longitudinal displacement of the arm 142 and that this displacement will be guided along a path parallel to the central axis X—X by virtue of the sliding engagement of pin 144 with the guide slot 151. A pin 145 affixed to the arm 142 slidingly engages the slot 135 of the arm 134. This arrangement also assures that any relative movement between the arms 142 and 134 will be parallel movement.

The arms 134 and 142 connect push rod 130 and carrier spool 116 and 126 to a cutting tool assembly described hereafter. The cutting tool assembly comprises a saddle 161 and what is sometimes known in the machining industry as a compound 160 which includes compound slide 162 and compound top 163. A tool post 164 attached to compound top 163 supports a cutting tool 165. The saddle 161 has a dovetail slot portion which engages a corresponsing dovetail 171 of a slide 170. The slide 170 is affixed to the mounting plate 31 by screws or bolts as through holes 172 in each end thereof. There are a number of tapped and threaded holes in the mounting plate 31 so that the slide 170 can be placed in several positions. As noted in the drawing, the slide is in a slanted or inclined position relative to the axis X—X. Since the saddle 161 has a dovetail groove which slidingly engages the dovetail 171, the compound 160, if moved, will be forced to follow a linear path, inclined from the central axis X—X, by virtue of the mutually engageable guide surfaces on the slotted saddle 161 and the slide 170. As known in the machining industry, the saddle 161 and compound slide 162 of the compound 160 may be rotated relative to each other and then tightly fixed in position so that various dispositions of the cutting tool 165 may be arranged. The compound top 163 has a dovetail groove therein for engagement with a corresponding dovetail projection on the compound slide 162. This mutually sliding engageable arrangement is similar to the mutually sliding engagement of the saddle 161 with the slide 170 and allows a transverse movement of the compound top 163.

The compound 160 and the saddle 161 of the cutting tool assembly are attached to the arms 134 and 142, respectively, so as to provide the necessary movements thereof. A pin 166 attached to the saddle 161 engages slot 143 of the arm 142. Thus, upon longitudinal movement of arm 142, the saddle 161 is forced to follow a linear path defined by the dovetail 171 of slide 170. Pivotally attached at 167 to the saddle 161 is a crank 180 at one end of which is a pin 181 which engages a transverse slot 136 in arm 134. Pivotally attached at 182 to the opposite end of the crank 180 is a short link 183 which is also pivotally attached at 184 to the compound top 163. Thus, longitudinal movement of the arm 134 is translated through the pin 181 to crank 180 causing the pivoting thereof about the pivot 167. This in turn causes a force to be translated to the compound top 163 through the pivot 184 which causes the compound top 163 to slide relative to the compound slide 162 in a transverse direction.

A support plate 200 projects into the smaller portion 11 of the housing and supports a bearing block 201 and a bearing plate 202 at the opposite end thereof. Bearing 203 carried by the bearing block 201 and bearing 205 carried in the bearing plate 202 support a rotating shaft 206 and a surrounding hollow shaft 207. A gear 208 is attached to one end of the inner shaft 206 and a gear 209 is keyed to the outer or hollow shaft 207. The gear 209 rotates on a bearing 211 carried by a bearing plate 212. A hand wheel 213 is connected to a bevelled gear 214 which engages bevel gear 215 affixed to the outer hollow shaft 207. Likewise a hand wheel 216 drives a bevel gear 217 which engages a bevel gear 218 attached to the end of the inner shaft 206. It can thus be understood that rotation of the hand wheel 213 effects rotation of outer shaft 207 and rotation of hand wheel 216 effects rotation of inner shaft 206. It will be noted that a bar 220 is attached to the ring plate 15 by a threaded socket 221. The bar 220, extending the length of housing 11, is supported at the opposite end by end plate 18. The bar 220 slidingly supports support plate 200 and elements supported thereon and allows limited linear movement of these elements.

Figure 3:
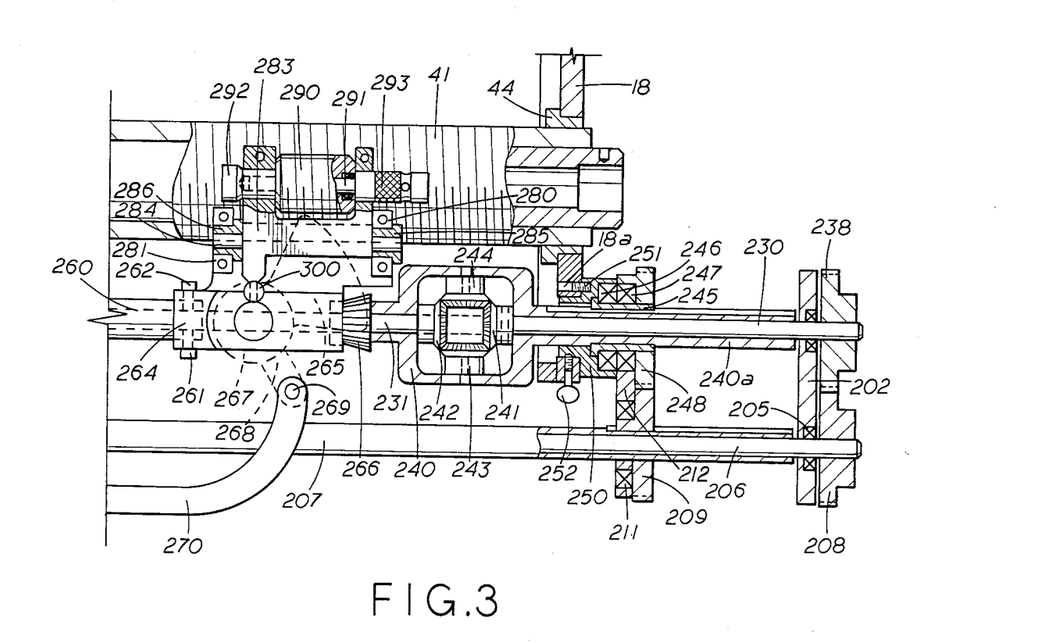
FIG. 3 is a detailed view of a portion of the apparatus of the present invention.

Supported parallel to the shaft 206 and 207 is a small shaft 230 which is attached by a differential 240 to another small shaft 231 which extends through the bulkhead 22 and is provided with a threaded portion 231a engageable with a corresponding threaded hole in the flange 121 of outer sleeve 120. As best seen in FIG. 3, the differential 240 supports four bevel gears 241, 242, 243 and 244. The bevel gear 241 is affixed to shaft 230. The bevel gears 243 and 244 are mounted for rotation within the differential 240. It can thus be understood that the rotation of shaft 230 in on direction is translated through gears 243,244 to the bevel gear 242 to cause the shaft 231 to rotate in the opposite direction. The differential 240 has a hollow shaft portion 240a which extends therefrom through end plate 18. The hollow portion 240a is externally threaded for engagement with a threaded bushing 245 which supports bearings 246, 247 and a gear 248 which meshes with gear 209. The bearing 246 is also surrounded by a hub 250 which under some conditions may move in and out of a hole provided in the end plate 18. To do so a pin 251 must be properly aligned with a corresponding hole 18a in the end plate 18. The hub 250 may be locked in this position by an engagement with a thumb screw 252.

Attached to the flange 112, which is in turned attached to the carrier or sleeve 110, is a hollow shaft 260. The hollow shaft 260 does not rotate but allows rotation of the small shaft 231 surrounded thereby. The shaft 260 passes through a hole in the bulkhead 22 in a sliding relationship. Attached to the end of the shaft 260, such as by set screws 261 and 262 in FIG. 3, is a tubular member 264 on which is mounted, for rotation about an axis perpendicular to the axis of shaft 260, a partial gear 265. The teeth of the partial gear 265 engage a pinion gear 266 attached to the differential carrier 240. From the hub portion 267 of the partial gear 265 entends a crank arm 268 pivotally attached by a pivot connection 269 to an arm member 270. The other end of arm member 270 is attached by a pivot connection 271 to a threading lever 272 one end of which is connected by another pivot connection 273 to the block 201. It can be understood that manually moving the lever 272 from the position shown in FIG. 1 to the left, as viewed in FIG. 1, the partial gear 265 will be rotated clockwise on the axis of hub 267 causing rotation of the pinion gear 266 and the differential carrier 240.

Figure 2:
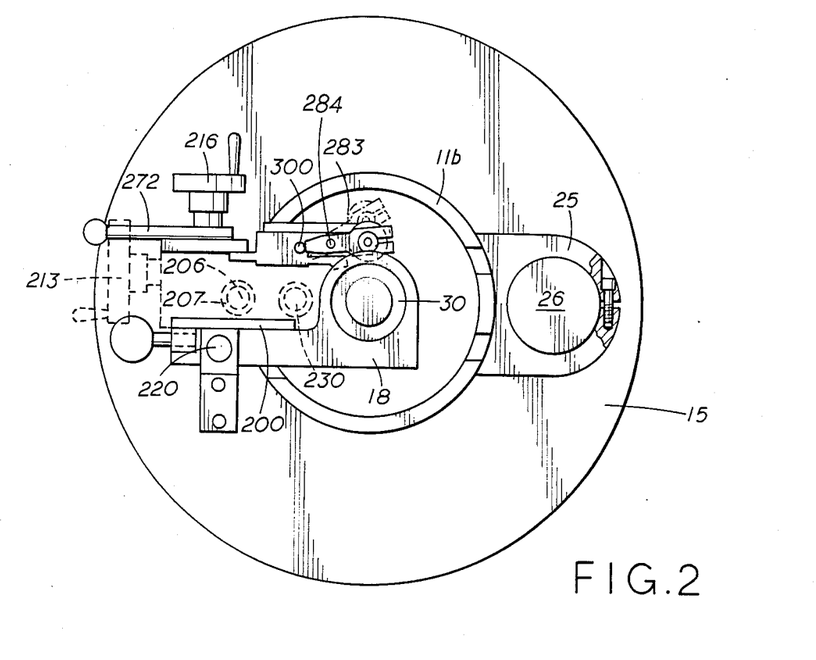
FIG. 2 is an end view, taken along lines 2—2 of FIG. 1, showing one end of the apparatus of the present invention, according to a preferred embodiment thereof.

Referring also to FIGS. 2 and 3 it will be noted that attached to the plate 220 of the machine by bearing blocks 280 and 281 is a yoke member 283. The yoke 283 is mounted on a shaft 284 for rotation within sleeve bearings 285 and 286. Yoke 283, in turn, rotatingly supports a groove thread follower 290 the grooves of which correspond with threads on the thread guide 41. The follower 290 is mounted for rotation on a shaft 291 threaded into a hub 292. Rotation of a knurled portion 293 of the shaft 291 will allow limited linear adjustment of the thread follower 290 for purposes to be more fully understood hereafter. Projecting from the yoke 283 is a ball follower 300 which engages a helical cam slot (not shown) machined in the periphery of the hub portion 267 of the partial gear 265. The cam slot 301 is cut in such a manner that upon rotation of the partial gear 265 from a first position to a second position, the thread follower 290 is pivoted from a first postion or upper position not engaging the thread guide 41, to a second or lower position engaging the thread guide 41 (see dotted lines in FIG. 2).

As earlier discribed herein, the jaw assembly J is attached to the pipe joint 1 and aligned therewith by a thread gauge assembly T. After the jaw assembly is properly attached so that the circular base plate 60 is in a rigid fixed concentric relationship with the pipe end 1, the thread gauge assembly T is removed and the machine M attached to the jaw assembly J as previously described and as shown in FIG. 1. The machine M is then in position for facing the annular surface 3 of pipe 1 or for threading or rethreading the thread 2.

To face or reface the annular surface 3 of pipe 1 with machine M, the gears 209 and 248 must be threaded down the threaded hollow shaft portion 240a *of the differential 240. The differential 240 must be turned so that the pin 251 engages the hole 18a* in the end plate 18. The hub 250 and the portions of the machine which move therewith are then locked into this position by thumb screw 252. Note that at this point, the threading lever 272 can not be moved because the differential 240 is locked in place and the engagement of the partial gear 265 with the pinion gear 266 prevents movement of the arm 270.

Hand wheel 213 may then be turned counterclockwise. This causes the hollow shaft 207 to rotate clockwise which in turn causes gear 209 to turn clockwise and gear 248 to turn counterclockwise. Rotation of the gear 248 rotates the threaded bushing 245 which causes the differential 240 to move in a linear direction due to the fact that the hollow shaft portion 240a thereof is in threaded engagement with the rotating threaded hub 245. The linear movement is toward the pipe joint 1. This also causes the threading lever 272, the hand wheels 213, 216, the hollow shaft 207 and the partial gear 265 to move in a linear direction toward the pipe joint 1. At the same time, the primary pushing shaft 260 and the secondary pushing shaft 231 causes the inner carrier 110 and the outer carrier 120 to move linearly therewith. The inner carrier 110 which does not rotate carries carrier spool 116 which does rotate with the shaft 30 because of the driving pin 106. The carrier spool 116 pushes the arm 142 which in turn pushes (or pulls) the saddle 161. These linear movements take place by the rotation of the hand wheel 213 while the shaft 30 and the cutting tool assembly mounted on the mounting plate 31 rotates. These linear feed components are operable to provide generally longitudinal linear motion to the cutting tool assembly, relative to the central axis of the machine.

When the cutting tool 165 has been fed linearly up to the shoulder or surface 3, it is then necessary that the cutting tool be moved transversely for cutting the surface 3. This is accomplished as follows. The hand wheel 216 is rotated in a clockwise direction causing the inner shaft 206 and gear 208 to turn counterclockwise. This causes gear 238 to turn in a clockwise direction, turning the shaft 230 and bevel gear 241 in a clockwise direction. Rotation of the bevel gear 241 in a clockwise direction is transmitted through bevel gears 243 and 244 to bevel gear 242 causing the shaft 321 to rotate in a counterclockwise direction. This then causes the outer carrier 120, to move away from the pipe joint 1 because of left hand threads 231a on the shaft 231. The outer carrier 120, which does not rotate, carries the carrier spool 126 which does rotate with the shaft 30 because of the driving pin 106. The spool 126 pulls the arm 130 rotating the bell crank 180 and causing the compound slide 162 to move radially or transversely relative to the central axis X—X of the machine M. These movements allow the cutting tool 165 to cut across surface 3 of the pipe joint 1 cutting or refacing the surface.

To thread with machine M, thread guide 41 of the desired thread pitch is placed on the shaft 30. A thread follower 290 of corresponding pitch (see FIG. 3) is placed in the yoke 283. Then the thumb screw 252 is loosened and the gear set 209 and 248 is threaded down toward the gear 208 and 238. This is accomplished by rotating the hand wheel 213 which rotates shaft 207 and gear 209. Gear 209 meshes with gear 248. Gear 248 is mounted on the threaded bushing 245. As the bushing rotates, it threads along the hollow shaft portion 240a of the differential 240 toward bearing plate 202 and the gear set 208, 238.

The threading lever 272 is then moved toward the pipe joint 1 (see dotted line position in FIG. 1). This causes the partial gear 265 to rotate approximately 45°. Due to the gearing arrangement of differential 240, the differential 240 is rotated one full turn. To do so, bevel gear 241 must remain stationary. This is accomplished by the operator holding hand wheel 216 to prevent inner shaft 206, gear set 208, 238 and small shaft 230 from rotating.

Rotation of differential 240 causes the secondary shaft 231 to turn two revolutions in a counterclockwise direction. This pulls the carrier spool 126 away from the pipe joint 1. This pulls the push rod 130 and arm 134, rotating the bell crank 180 and causing the compound slide 162 to move transversely, relative to the central axis X—X, a distance equal to twice the pitch of the thread on the shaft 231. The small transverse movement provides the automatic advance and retraction of the cutting tool 165 at the beginning and ending, respectfully, of the threading operation. Further movement or adjustment of the cutting tool in a transverse direction can be accomplished with the hand wheel 216 as previously described with reference to facing operation.

When the threading lever 272 is moved toward the tool joint 1 (dotted line position in FIG. 1) the thread follower 290 (see FIG. 3) is moved from its first or nonengaging position to its second position engaging the thread guide 41. This movement is accomplished by engagement of the ball follower 300 with the helical cam slot cut into the hub portion 267 of the partial gear 265 as previously described. This movement causes pivoting of the yoke 283 on the shaft 284 until the thread follower 290 engages the thread guide 41. Since the thread guide 41, and shaft 30 on which it is mounted is rotating, the movable portion of the machine to which the thread follower 90 is attached will move in a linear direction toward the pipe joint 1. If the pitch of the thread follower 290 and thread guide 41 are not properly aligned, the thread follower 290 will drop into thread guide 41 as it rotates into alignment.

As the threaded follower 290 moves down the thread guide 41, the tool assembly is moved uniformly in a linear direction. However, since the saddle 161 slides along the inclined slide 170, this movement is actually along an inclined linear path the incline of which corresponds with the taper of the threaded portion 2 of pipe joint 1.

Thus, the machine M is capable of facing or refacing pipe joint shoulders and is also capable of threading or rethreading threads of such a pipe joint. The machine is relatively small in comparison to shop machines. Thus, it is portable and may be used to face and thread pipe joints in the field. This is particularly useful in reconditioning of damaged pipe joints in the field so that it is not necessary to transport the pipe to a machine shop. This results in a substantial cost saving.

A single embodiment of the machine of the present invention has been described herein. However, many variations of the machine can be made without departing from the spirit of the invention. Accordingly, it is intended that the scope of the invention be limited only by the claims which follow.

I claim:

1. Portable apparatus for field threading or rethreading of threaded pipe comprising:
   housing means;
   a main shaft carried by said housing means for rotation therein about a central axis;
   attachment means for attaching said housing means to the end of pipe so that said central axis and the axis of said pipe are substantially coaxial;
   power means attached to said main shaft for said rotation thereof;
   tool mounting means attached to said main shaft for rotation therewith;
   a cutting tool assembly attached to said tool mounting means for cutting said pipe end upon rotation of said main shaft;
   linear feed means carried by said housing operable to provide generally longitudinal linear motion to said cutting tool assembly relative to said central axis;
   radial feed means carried by said housing operable to provide generally transverse motion to said cutting tool assembly relative to said central axis; and translating means attached to said cutting tool assembly and operable in response to rotation of said main shaft to translate rotatable movement thereof to simultaneous linear movement of said cutting tool assembly so as to produce spirally cut thread surfaces on said pipe end.

2. Portable apparatus as set forth in claim 1 in which said tool mounting means and said tool assembly are attached through mutually engageable guide surfaces by which said cutting tool assembly is forced to follow a linear path inclined from said central axis upon operation of said linear feed means and simultaneous rotation of said main shaft so as to produce tapered cutting surfaces on said pipe end.

3. Portable apparatus as set forth in claim 2 in which said tool mounting means comprises a fixed first mounting member and a second relatively movable mounting member attached to said linear feed means, said first and second mounting members carrying said mutually engageable guide surfaces by which said cutting tool assembly is forced to follow said inclined linear path.

4. Portable apparatus as set forth in claim 3 including a third mounting member attached to said radial feed means, said second and third mounting members having mutually engageable guide surfaces by which said cutting tool assembly is forced to follow a transverse path relative to said central axis in response to operation of said radial feed means.

5. Portable apparatus as set forth in claim 2 in which said tool mounting means and said tool assembly are attached through other mutually engageable guide surfaces by which said cutting tool assembly is forced to follow a transverse path relative to said central axis in response to operation of said radial feed means.

6. Portable apparatus a set forth in claim 1 in which linear feed means comprises first and second shafts one of which is connected to said cutting tool assembly and the other of which is manually operable through mutually connecting means to provide linear motion to said one shaft resulting in said longitudinal linear motion of said cutting tool assembly.

7. Portable apparatus as set forth in claim 1 in which said radial feed means comprise first and second shafts one of which is connected to said cutting tool assembly by a crank member and the other of which is manually operable through mutually connecting means to provide linear motion to said one shaft and pivoting of said crank member to provide said generally transverse motion to said cutting tool assembly.

8. Portable apparatus as set forth in claim 1 in which said radial feed means is operable independently of said translating means.

9. Portable apparatus as set forth in claim 1 in which said attachment means for attaching said housing means to the end of a pipe comprises a jaw assembly attachable to said pipe end independently of said housing means and including a circular base plate for concentric alignment with said pipe end, said attachment means also comprising a circular housing base affixed to said housing means and the center of which coincides with said main shaft central axis, said housing base being attachable to said jaw assembly, after attachment of said jaw assembly to said pipe end, so that said central axis and said pipe axis are substantially coincidental.

10. Portable apparatus as set forth in claim 9 including an annular groove carried on one of said circular base plate and said housing base and an annular lip carried on the other cooperatively engageable, upon attachment of said housing base to said jaw assembly, to coaxially align said pipe end and said main shaft.

11. Portable apparatus as set forth in claim 10 in which said jaw assembly includes a plurality of radially moveable jaws engageable with said pipe and for said attachment thereto.

12. Portable apparatus as set forth in claim 11 in which said circular base plate is affixed to said jaw assembly for limited radial movement as to allow concentric alignment of said base plate with said pipe end even when the remainder of said jaw assembly is not concentrically aligned therewith.

13. Portable apparatus as set forth in claim 9 including a thread gage assembly attachable to said circular base plate before attachment of said housing base to said jaw assembly, said thread gage assembly being engageable with threads on said pipe end to concentrically align said circular base plate with said pipe end, said thread gage assembly being removable to allow said attachment of said housing base to said jaw assembly.

14. Portable apparatus for field threading or rethreading of threaded pipe comprising:
   housing means;
   a main shaft carried by said housing means for rotation therein about a central axis;
   attachment means for attaching said housing means to the end of a pipe so that said central axis and the axis of said pipe are substantially coincidental;
   power means attached to said main shaft for said rotation thereof;
   tool mounting means attached to said main shaft for rotation therewith;
   a cutting tool assembly attached to said tool mounting means for cutting said pipe end upon rotation of said main shaft; and
   translating means attached to said cutting tool assembly and operable in response to rotation of said main shaft to translate rotatable movement thereof to simultaneous linear movement of said cutting tool assembly so as to produce spirally cut surfaces on said pipe end, said translating means comprising a thread guide fixed to said main shaft and rotatable therewith and a thread follower connected to said cutting tool assembly, said thread follower being engageable with said thread guide and longitudinally moveable relative thereto in response to rotation of said main shaft and said thread guide to effect said simultaneous linear movement of said cutting tool assembly, said translating means also including clutch means attached to said thread follower, said clutch means being operable to move said thread follower from a first position not engaging said thread guide to a second position engaging said thread guide, said translating means being inoperative when said thread follower is in said first position.

15. Portable apparatus as set forth in claim 14 in which said tool mounting means and said tool assembly are attached through mutually engageable guide surfaces by which said cutting tool assembly is forced to follow a path inclined from said central axis upon operation of said translating means and sumultaneous rotation of said main shaft so as to produce tapered spirally cut surfaces on said pipe end.

16. Portable apparatus as set forth in claim 4 including radial feed means carried by said housing and operable to provide generally transverse motion to said cutting tool assembly relative to said central axis, said clutch means being engageable with said radial feed means and operable, upon movement of said thread follower from said first position to said second position, to transversely move said cutting tool assembly from a position away from cutting engagement with said pipe end to a position for cutting engagement with said pipe end.

17. Portable apparatus as set forth in claim 16 including means by which said radial feed means may be operated independently of said clutch means.

18. Portable apparatus as set forth in claim 16 including adjustment means by which one of said thread follower and said cutting tool assembly may be linearly adjusted so that the linear relationship of said cutting tool assembly to said spirally cut surfaces may properly correspond with the linear relationship of said thread follower to said thread guide.

19. Portable apparatus as set forth in claim 14 including adjustment means by which one of said thread follower and said cutting tool assembly may be linearly adjusted so that the linear relationship of said cutting tool, assembly to said spirally cut surfaces may properly correspond with the linear relationship of said thread follower to said thread guide.

20. Portable apparatus as set forth in claim 14 including lever means attached through mutually connecting elements to said cutting tool assembly and by which said cutting tool assembly may be moved longitudinal when said thread follower is in said second inoperative position.

21. Portable apparatus for field threading or rethreading of threaded pipe comprising:
housing means;
a main shaft carried by said housing means for rotation therein about a central axis;
attachment means for attaching said housing means to the end of a pipe comprising a jaw assembly attachable to said pipe end independently of said housing means and including a circular base plate for concentric alignment with said pipe end, said attachment means also comprising a circular housing base affixed to said housing means and the center of which coincides with said main shaft central axis, said hosuing base being attachable to said jaw assembly, after attachment of said jaw assembly to said pipe end, so that said central axis and the axis of said pipe are substantially coincidental;
power means attached to said main shaft for said rotation thereof;
tool mounting means attached to said main shaft for rotation therewith;
a cutting tool assembly attached to said tool mounting means for cutting said pipe end upon rotation of said main shaft; and
translating means attached to said cutting tool assembly and operable in response to rotation of said main shaft to translate rotatable movement thereof to simultaneous linear movement of said cutting tool assembly so as to produce spirally cut surfaces on said pipe end.

22. Portable apparatus as set forth in claim 21 including an annular groove carried by one of said circular base plate and said housing base and an annular lip carried by the other cooperatively engageable upon attachment of said housing base to said jaw assembly to coaxially align said pipe and said main shaft.

23. Portable apparatus as set forth in claim 22 in which said jaw assembly includes a plurality of radially movable jaws engageable with said pipe end for said attachment thereto.

24. Portable apparatus as set forth in claim 23 in which said circular base plate is affixed to said jaw assembly for limited radial movement so as to allow concentric alignment of said base plate with said pipe end even when the remainder of said jaw assembly is not concentrically aligned therewith.

25. Portable apparatus as set forth in claim 21 including a thread gage assembly attachable to said circular base plate before attachment of said housing base to said jaw assembly, said thread gage assembly being engageable with threads on said pipe end to concentrically align said circular base plate with said pipe end, said thread gage assembly being removable to allow said attachment of said housing base to said jaw assembly.

* * * * *